Patented Mar. 5, 1940

2,192,488

UNITED STATES PATENT OFFICE 2,192,488

METHOD OF MAKING PAPER

Arthur Reilly, Westbrook, Maine, assignor to S. D. Warren Company, Boston, Mass., a corporation of Massachusetts No Drawing. Application July 1, 1936, Serial No. 88,386

8 Claims. (Cl. 92—21)

This invention relates to paper and its manufacture and more particularly to a method of making sized paper and the resulting product.

One object of the invention is to simplify the sizing operations in paper manufacture which have heretofore involved, in general, the necessity of converting the size, at some stage of the operations, from a soluble to an insoluble form by the addition of chemical reagents, or the manipulation of a size composition containing ammonium resinate. The latter does not require a chemical precipitant but is characteristically attended by the property of imparting an extreme degree of viscosity to its solutions in water.

Another object is to effect uniformity of sizing on both sides of the paper and/or throughout the sheet.

A further object of the invention is to provide a method for the sizing of paper which contains alkaline fillers, such as calcium carbonate, which tends to deteriorate sizes, and to interfere with the proper precipitating action of chemical precipitants.

Another object is to effect sizing after the formation of pulp into a web, so that the sizing actions and reactions shall be independent of the preparation of a uniform pulp in the beater and of the formation of the web—on the one hand—and so that the latter operations shall be independent of and unaffected by the presence of size—on the other.

Other objects will appear from the following disclosure.

A method for the preparation of a size composition which does not require the addition of chemical precipitating agents is disclosed in my copending application, Serial No. 88,385, filed on even date herewith. Briefly summarized, the method there described comprises the steps of: dispersing a resin such as rosin, in an aqueous vehicle, adding ammonia gradually and with agitation of the mixture, and warming slightly if necessary to facilitate solution, and subsequently heating to a temperature sufficient partially to decompose the resulting dissolved resinate and to liberate or regenerate the resin or rosin, in an extremely finely divided condition, of substantially colloidal dimensions. The proportion of ammonia added may be equivalent to or in excess of an equivalent of the resin.

An outstanding feature of such procedure is that the dissolved resinate presents a marked degree of viscosity, whereas, upon being regenerated by heat, the same or a greater amount of regenerated resin may be present and retained in colloidal suspension, which exhibits a very low viscosity, corresponding to that of water or even free ammonium hydroxide, and is of high fluidity or even limpid, depending somewhat, of course, upon the relative concentrations.

There is some tendency for the colloidal suspension of finely divided, regenerated resin, as thus produced, to agglomerate or coagulate into particles of larger size, especially if subjected to too vigorous or prolonged agitation, heat, and the like. This may be offset and prevented by the addition of a protective colloid, preferably to the solution from which the resin is to be regenerated. In this way the resin, as regenerated from solution, tends to form initially in finely divided condition and to be retained in its thus dispersed state. This promotes the capability of the regenerated resin particles (and also the dissolved ammonium resinate solution) to effect intimate contact and penetration around and between the fibers and other components of paper pulp or of the formed paper web. The protective colloids which may be used include: animal glue, casein, starch and the like.

It is found that if to the size dispersion described above there be added a soluble salt of ammonia, the value of the mixture as a paper-size may be materially increased. In my copending application, Serial No. 716,220, filed March 17, 1934, I have disclosed the use of ammonium salts to improve the sizing of paper containing alkaline filler which has been formed from stock already sized with rosin. The use of ammonium salt in the present invention as an ingredient of a size dispersion for surface-sizing, comprising ammonium resinate, is quite distinct from its use in the former disclosure. In the present invention the ammonium salt coacts with the ammonium resinate and/or regenerated rosin to give a degree of sizing notably greater than that given by the ammonium resinate solution used without ammonium salt, wholly unsized paper being used in each case. Indeed the addition of an ammonium salt to a dispersion containing sodium resinate will enable sodium resinate to be used as a surface size with passably fair results. A possible explanation of the benefit derived from the use of ammonium salt is that a double decomposition takes place between the ammonium salt and any soluble alkaline compound present. No precipitation or curdling occurs, but the evolution of ammonia gas during drying does leave the sheet less alkaline than would otherwise be the case. Soluble ammonium salts include the acetate, borate, bromide, carbonate, chloride, formate, nitrate, sulfate, and the like. Of these, partly because of cost, the sulfate is preferred.

In preparing a size dispersion containing a colloid and/or an ammonium salt, the mixed dispersion of ammonium resinate and regenerated rosin described above is desirable. However, by giving requisite care in manipulation, a solution of ammonium resinate containing practically no unsaponified rosin may be used with an ammonium salt with or without a colloid and give good results; and such combinations are included within the scope of the invention.

It is further found, in this aspect of the application of the invention, that paper webs which are alkaline or contain alkaline filler materials, may be treated by such procedure to great advantage, both in the matter of facility of operations and in the quality of the resulting sized paper product.

It is also observed that while a rosin size dispersion containing an ammonium salt is wholly effective, as above set forth, it is sometimes desirable to add a mordant, such as aluminum hydrate, so that the paper web will contain it in suitable distribution throughout the fibers before treatment with the size dispersion. The alum added to the furnish does not function as an acidic precipitant of the size as has heretofore been customary in the use of a rosin soap of a fixed alkali as a surface size. On the contrary, the alum reacts with the carbonate of the furnish to form insoluble gelatinous aluminum hydrate which envelopes the fibers and, after the application of the size, mordants or cements the rosin to the fibers. Such action may be physical or chemical, or both, in effecting firm union and adhesion between the fibers, and developing the sizing effect or resistance to ink penetration and feathering which occur in unsized or poorly sized papers.

Others have disclosed the sizing of unsized paper by a surface treatment with ammonium resinate with no aluminum compound being required. In the case of alkaline filled papers, however, such treatment is not effective to produce appreciable sizing; but in such alkaline filled paper sizing may be obtained by using an adjuvant with the ammonium resinate, such as a mordant in the furnish or an ammonium salt in the size mixture itself.

In addition to the foregoing, with reference to the preparation of the size composition, the addition of a protective colloid to the same is advantageous and more especially marked when the furnish or web is one containing an alkaline filler, in which it appears to retard the deleterious effect of the alkaline filler or salts derived therefrom upon the sizing material and allows the size to penetrate more evenly and more deeply.

A typical procedure for carrying out the method of the invention may be conducted as follows:

A fibrous mix is prepared in customary ways, which may contain alkaline filler, and to this is added a metallic mordant such as the (hydrated) oxides or hydroxides of aluminum, chromium iron, nickel, zinc or the like,—but preferably aluminum hydroxide, in finely and uniformly dispersed condition. This may be added to the furnish at any stage up to the formation of the web and either as a preformed preparation or by appropriate reaction in the mix, as by the addition of alum which will react with the dissolved portion of the alkaline filler to precipitate aluminum hydroxide in the beater, if this is the mordant desired.

Supplemental sizing reagents also may be added to the furnish at this stage which are more or less resistant to the presence of the alkaline filler, such as the various wax and paraffin sizes or emulsions—or the usual sizing reagents, even though they may be more or less degenerated by the alkalinity of the medium. But such additions are not necessary.

The furnish is then diluted and run out into the formation of a paper web in any of the usual ways for the manufacture of paper, and the moist paper web is treated with the sizing composition as hereinafter described.

The size component may consist of ammonium resinate alone, with the addition of protective colloid or ammonium salt or may comprise ammonium resinate and a dispersion of regenerated resin. It may be prepared and used in aqueous solution or dispersion alone, or with the addition of protective colloids and/or ammonium salts, etc., as already described.

In the preparation of the size composition, the resin, such as rosin, is crushed and then thoroughly wet with water or preferably dispersed therein by agitation and treated to the gradual addition of ammonia. This peptizes the resin particles, and dissolves a part by saponification to ammonium resinate. This action may be promoted by the mild application of heat. If a protective colloid is to be added, it is preferably introduced at this stage, especially for the purpose of controlling the regeneration of the size and maintaining the regenerated size in the form of minute particles against the tendency for them to grow or to agglomerate, as above pointed out. The mixture may then be further heated to a temperature sufficient to effect decomposition of the dissolved resin or ammonium resinate, which liberates or regenerates the resin in the form of very fine discrete particles. An ammonium salt such as ammonium sulphate may now be added. The solution is preferably cooled promptly and may also be diluted to the required concentration with water.

As the resin, ordinary rosin will ordinarily be preferred but other resins which are soluble (or dispersible) by ammonia and subject to subsequent decomposition by heat, reduction of pressure, etc.—or like physical treatment rather than by the addition of chemical precipitant, may be employed. Especially as applied to paper webs containing alkaline fillers. In either case it is especially significant that the ammonium resinate is subject to spontaneous and complete conversion to free resin or rosin, leaving no resinate component in the sizing composition, without the use of supplemental chemical reagents—which is very desirable.

The size composition as thus prepared (and diluted) may be applied to the paper web at any stage during or after its formation upon the paper machine—or it may be applied in a separate operation, even after the paper has been fully dried. In either case, it will, of course, require subsequent drying. Accordingly, to avoid unnecessary handling, it will usually be preferred to apply the size composition to the paper web while on the paper machine, and more particularly to the wet web between the presses and the first drier—or to the partially dried web between two sections of driers.

The size composition or dispersion may be applied to the paper web in substantially any convenient way, as by dipping, spraying, application, contact rolls, rotating brushes, etc., but preferably in such manner as to effect complete penetration of the web, but without disrupting the structure thereof and without undue loss of the size composition into the white water, etc. It may be applied to one or both sides of the paper web or sheet, as desired, but usually—and more particularly when the size composition or dispersion contains a protective colloid and an ammonium salt—application to one side is sufficient, for the fluid freely penetrates the web and imparts sizing uniformly throughout the sheet. This is probably attributable in part to the fine degree of sub-division of the regenerated size which is promoted by the protective colloid and to the peptizing effect of the ammonium salt upon both the dissolved ammonium resinate and the regenerated resin particles. The degree of sizing effected will, of course, depend largely upon the amount, composition, and concentration of the size dispersion applied—but also upon the nature of the web itself, and somewhat upon the subsequent rate and degree of drying and heating the paper sheet.

Ammonium salts which may be used in the manner above described include the acetate, borate, bromide, carbonate, chloride, formate, nitrate, sulphate, and the like. But of these, the sulphate is preferred.

The following representative examples of the practical application of the invention will exemplify its operation in actual paper mill practice.

*Example 1*

The following materials were added to the beater in the order given:

| | Pounds |
|---|---|
| Sulphite fiber | 800 |
| Soda | 450 |
| Broke | 290 |
| Starch (cooked) | 90 |
| Paraffin (emulsified) | 3 |
| Rosin size | 37 |
| Alum | 50 |
| Calcium carbonate | 456 |

The mixture was moderately beaten at 6% consistency for 2½ hours. It was then passed through two stock chests and a Jordan engine, with dilution, and run out on a Fourdrinier wire to make a web which when dry weighed 38 pounds per ream of 500 sheets, cut 25 x 38 inches. At the last press before the driers a surface-size was applied to the wire side of the wet web. The lower press roll turned in a tank of the size and carried the size up until it contacted the paper web at the nip between the rolls. Between 1½% and 2% of rosin was put in the paper by this treatment.

The surface-size suspension thus applied comprised 6.3% of rosin as mixed ammonium resinate and regenerated rosin, 0.6% of casein, and 10% of ammonium sulfate.

After leaving the size-press the web was passed to driers and subsequently to the machine calender where it was given a medium machine finish. Ink penetration tests on the finished paper showed a size test of 165 seconds on the felt side, and 180 seconds on the wire side, and both sides could be written on satisfactorily with pen and ink. The ink penetration method employed for thus measuring the degree of sizing in the finished sheet was to note the time (in seconds) required for writing ink to penetrate through a piece of the paper—when floated upon the surface of the ink.

*Example 2*

A furnish was prepared containing the following constituents:

| | Pounds |
|---|---|
| Sulphite fiber | 1200 |
| Broke | 500 |
| Calcium carbonate | 100 |
| Alum | 40 |
| No size. | |

The furnish was run out on a paper machine and to both sides of the wet web, at a size-press before the first drier, a size mixture of the following composition was applied:

| | Per cent |
|---|---|
| Rosin as mixed ammonium resinate and regenerated rosin | 5 |
| Casein | 0.5 |

The paper was then dried and calendered. The weight was 43 pounds for a 25 x 38, 500 sheet ream.

The ink penetration test gave 15 seconds for each side, and the paper was satisfactory as a base for coated paper.

*Example 3*

A furnish was prepared containing constituents in the following proportions:

| | Pounds |
|---|---|
| Soda fiber | 1250 |
| Sulfite fiber | 650 |
| Calcium carbonate | 800 |
| Rosin size | 57 |
| Alum | 120 |

This mixture was beaten moderately and then formed into a web to make 70 pound paper.

To the wet web, on the wire side, was applied a surface-size mixture which incorporated in the web 2% of rosin, as mixed ammonium resinate and regenerated rosin, and 0.3% of casein.

The paper was pressed and dried.

Ink penetration tests on the uncalendered paper gave on the felt side 18 seconds, on the wire side 90 seconds.

*Example 4*

To the wire side of the wet web, made as in Example 3, was applied a surface-size mixture which incorporated in the web 2% rosin as mixed ammonium resinate and regenerated rosin, and 3% ammonium sulfate.

The web was pressed and dried.

Ink penetration tests on the uncalendered paper gave on the felt side 36 seconds, on the wire side 52 seconds.

*Example 5*

To the wire side of the wet web, made as in Example 3, was applied a size which left in the web 2% rosin, as mixed ammonium resinate and regenerated rosin, 0.3% casein, and 3% ammonium sulfate.

The web was pressed and dried.

Ink penetration tests on the uncalendered paper gave on the felt side 2500 seconds, on the wire side 2500 seconds.

*Example 6*

The following furnish was mixed in a beater:

| | Pounds |
|---|---|
| Sulphite fiber | 700 |
| Soda fiber | 320 |
| Broke | 580 |
| Alum | 15 |
| Cooked starch | 70 |
| Calcium carbonate | 650 |

The stuff was beaten moderately and then formed into paper on a Fourdrinier machine. The weight was 30 pounds per 500 sheet ream, cut 25 x 38 inches. The filler content of the dry paper was 27%. To both sides of the wet web at the last press before the drier was applied a surface size containing:

|   | Pounds per gallon |
|---|---|
| Rosin as mixed ammonium resinate and colloidal regenerated rosin | 0.18 |
| Cooked oxidized starch of medium to high viscosity | .46 |

The paper was then dried and calendered.

Ink penetration tests gave over 60 seconds on both sides. Both sides were satisfactorily sized for pen and ink writing.

By the term "alkaline filler," as used herein, I mean mineral matter relatively insoluble, but still soluble enough to give the stock suspension a pH value above 7. Such fillers include calcium carbonate, magnesium carbonate, magnesium oxide or hydroxide, satin white, and the like.

By the term "paper-web" I mean to include the product from the point where the stock contacts the web-forming device up to and including the finished paper.

By "regenerated rosin" I mean rosin that has been saponified and has then been returned to an insoluble but probably highly colloidal condition by the breaking up of ammonium resinate by heat. The regenerated rosin may possibly be an insoluble acid rosin-soap which is further broken down upon drying, or it may be a hydrated form of rosin. In any case the particles are considerably finer than those usually possible to obtain by mechanical means of dispersing rosin. A consequence of the smaller particle size is a greater specific surface and hence better sizing efficiency in the regenerated rosin.

By "metallic hydrate" or "aluminum hydrate" I mean to include the form in which the metal mordant is precipitated in the beater or in premixed size and the form in which it exists in the dried paper. It is possible that in some cases the metal will exist as the oxide rather than as the hydroxide, but I wish to include both forms within my meaning of hydrate.

By the practice of this invention sized paper containing alkaline filler, especially calcium carbonate, may be made without departing in any way from the traditional methods of mixing fiber, filler, and alum, together with rosin size if desired, in the beating engine. The web formed therefrom is treated with a dispersion comprising ammonium resinate, which requires no precipitant to react therewith. By such an application to the wire side of a sheet already containing sizing, any tendency for weakness on the wire side is corrected. By the inclusion of a colloid and an ammonium salt in the ammonium resinate dispersion, sizing is evenly and effectively produced throughout a sheet of paper. The use of a mixture of ammonium salt and a rosin soap of ammonium or of a fixed alkali to impart sizing to paper of any kind is believed to be novel and is included within the scope of this disclosure.

I claim:

1. Method of making paper comprising the steps of forming a paper web containing alkaline filler and a mordant, and then applying thereto as a surface size a size composition characterized by containing an ammonium resinate and resin regenerated therefrom, thereby forming an alkaline filled sized paper sheet.

2. Method of making paper comprising the steps of forming a paper web containing alkaline filler, and then applying thereto as a surface size a size composition characterized by containing an ammonium resinate and an ammonium salt, thereby forming an alkaline filled sized paper sheet.

3. Method of making paper comprising the steps of forming a paper web containing alkaline filler and a mordant, and then applying thereto as a surface size a size composition characterized by containing an ammonium resinate and an ammonium salt, thereby forming an alkaline filled sized paper sheet.

4. Method of making paper comprising the steps of forming a paper web containing alkaline filler and a mordant, and then applying thereto as a surface size a size composition characterized by containing an ammonium resinate and a protective colloid, thereby forming an alkaline filled sized paper sheet.

5. Method of making paper comprising the steps of forming a paper web containing alkaline filler and then applying thereto as a surface size a size composition characterized by containing an ammonium resinate, resin regenerated therefrom, and an ammonium salt, thereby forming an alkaline filled sized paper sheet.

6. Method of making paper comprising the steps of forming a paper web containing alkaline filler and then applying thereto as a surface size a size composition characterized by containing an ammonium resinate, resin regenerated therefrom, a protective colloid, and an ammonium salt, thereby forming an alkaline filled sized paper sheet.

7. Method of making paper comprising the steps of forming a paper web containing alkaline filler and a mordant and then applying thereto as a surface size a size composition characterized by consisting primarily of a solution of ammonium resinate, thereby forming an alkaline filled sized paper sheet.

8. Method of making paper comprising the steps of forming a paper web containing alkaline filler and a mordant and then applying thereto as a surface size a size composition characterized by consisting primarily of a solution of ammonium resinate, resin regenerated therefrom, and a protective colloid, thereby forming an alkaline filled sized paper sheet.

ARTHUR REILLY.